United States Patent Office 2,964,451
Patented Dec. 13, 1960

2,964,451

SYNTHESIS OF ALKALOIDS

Samuel C. Pan, Metuchen, and Frank L. Weisenborn, Middlebush, N.J., assignors to Olin Mathieson Chemical Corporation, New York, N.Y., a corporation of Virginia No Drawing. Filed May 6, 1958, Ser. No. 733,251

3 Claims. (Cl. 195—81)

This invention relates to the synthesis of new alkaloids and, more particularly, to the preparation of 17, 18-diesters of methyl pseudoreserpate and methyl raunescate, and to improved methods for preparing methyl pseudoreserpate and methyl raunescate.

The new derivatives of this invention may be represented by the general formula

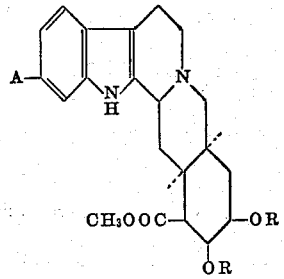

wherein A is hydrogen or methoxy, and R is acyl. Particularly, preferred are those compounds wherein R is the acyl radical of a hydrocarbon carboxylic acid of less than ten carbon atoms, as exemplified by the lower alkanoic acids (e.g. acetic, propionic and enanthic acid), lower alkenoic acids, monocyclic aromatic carboxylic acids (e.g. benzoic and toluic acid), monocyclic aralkanoic acids (e.g. phenacetic and β-phenyl propionic acid), cycloalkane carboxylic acids, and cycloalkene carboxylic acids.

The new compounds of this invention are prepared by a two-step process, the first step of which represents a novel and improved method for preparing methyl pseudoreserpate and methyl raunescate.

The new compounds of this invention are pharmacologically active substances which possess ataractic and hypotensive activity. Thus, they may be used instead of reserpine in the treatment of psychiatric or hypertensive disorders, for which purpose they are administered parenterally or orally, as in the form of an injection solution, a tablet, syrup or elixir.

In the first step of the process of this invention, enzymes of Streptomyces aureofaciens or Streptomyces rimosus are caused to act on methyl reserpate or methyl deserpidate. The reaction may be accomplished by including the alkaloid in an aerobic culture of the microorganism or by bringing together, in an aqueous medium, the alkaloid, air and enzymes of non-proliferating cells of the microorganism. In general, the conditions of culturing the Streptomyces for the purposes of this invention are (except for the inclusion of the alkaloid to be converted) the same as those of culturing Streptomyces aureofaciens for the production of chlortetracycline or tetracycline, i.e. the microorganism in aerobically grown in contact with (in or on) a suitable fermentation medium. A suitable medium essentially comprises a source of nitrogenous and growth-promoting factors, and an assimilable source of carbon and energy. The latter may be a carbohydrate and/or the yohimbine itself. Preferably, however, the medium includes an assimilable source of carbon and energy in addition to the alkaloid.

The nitrogen source materials may be organic (e.g. soybean meal, cornsteep liquor, meat extract and/or distillers solubles) or synthetic (i.e. composed of simple, synthesizable organic or inorganic compounds such as ammonium salts, alkali nitrates, amino acids, urea or thiourea).

As to the energy source materials, lipids such as fats or fatty acids (e.g. lard oil, soybean oil, linseed oil, cottonseed oil, peanut oil, fancy mutton tallow, sperm oil, olive oil, tristearin, triolein, and stearic, palmitic, oleic, linoleic and myristic acid); carbohydrates (e.g. glucose, fructose, sucrose, lactose, maltose, dextrins and starches); or glycerol may be used. These materials may be used either in purified state or as concentrates, such as whey concentrated, corn, wheat or barley mash, or mixtures thereof. It is to be noted, however, that the alkaloid is added to the fermentation medium essentially as a precursor and not as an energy source.

To prepare the esters of this invention methyl pseudoreserpate or methyl raunescate is interacted with an acylating agent, such as an acyl halide or acid anhydride of a hydrocarbon carboxylic acid of less than ten carbon atoms (e.g. a lower alkanoic acid anhydride such as acetic anhydride). To form the diester at least two equivalents of acylating agent per mole of alkaloid reactant is employed. The reaction is preferably conducted in the presence of an organic base (e.g. pyridine).

The following examples are illustrative of the invention:

EXAMPLE 1

Methyl raunescate (a) Fermentation.—A one-week old agar slant (prepared by growing the culture on a medium composed of 1.0 g. glucose, 0.25 g. of yeast extract, 0.1 g. of dipotassium hydrogen phosphate and 2 g. of agar in 100 ml. of water) of Streptomyces aureofaciens A.T.C.C. 13132 is used to inoculate two flasks each containing 100 ml. of an aqueous sterilized medium containing 1.5% soybean meal, 2.5% glucose and 0.25% calcium carbonate. The flasks are incubated at 25° C. on a rotary shaker set at 280 r.p.m. with a 2-inch displacement. After four days, these growing cultures are used to inoculate 45 flasks containing 100 ml. each of the same medium. To each flask is added 5 ml. of a solution formed by dissolving 2.25 g. of methyl deserpidate in 225 ml. of water containing 7 ml. of 1 N sulfuric acid and sterilizing by filtration through sintered glass. The flasks are then incubated on the same shaker and harvested after two weeks.

(b) Isolation.—The harvested broth (4.5 liters) is combined, adjusted to pH 9–10 and extracted four times with 800 ml. portions of methyl isobutyl ketone. The unreacted starting material and the methyl raunescate now present in the methyl isobutyl ketone are extracted back into an aqueous acid solution by shaking with 0.024 N sulfuric acid (700 ml.). This aqueous solution is adjusted to pH 9–10 with sodium hydroxide, buffered and extracted three times with benzene (350 ml. each time) to remove most of the methyl deserpidate. The aqueous phase is then extracted four times with chloroform (250 ml. each time). The chloroform extract is dried over anhydrous sodium sulfate and evaporated down to dryness under vacuum.

The solids obtained are dissolved in 6 ml. of methanol and chromatographed on 12 sheets of Whatman No. 1 filter paper, 10.5" wide. The solvent system used is i-amyl alcohol-carbon tetrachloride propionic acid (100:10:2) against water vapor equilibrated paper. The chromatogram is allowed to develop for 40 hours. The product appears at a band 3–4 inches wide with the front located 5–7 inches from the origin. This band can be detected by fluorescence under ultraviolet light, absorption of ultraviolet light and reduction of ferric ferricyanide reagent used as a spray. The band is cut off, shredded and eluted 4–5 times with methanol. The methanol eluate is taken to dryness in vacuo and the residue taken up in chloroform. The chloroform solution is washed with 5% sodium bicarbonate solution, dried over sodium sulfate and concentrated to dryness. The methyl rausinate is isolated as a nitrate salt by crystallization from dilute acetic acid-ammonium nitrate solution.

EXAMPLE 2

Following the procedure of Example 1, but substituting Streptomyces rimosus N.R.R.L. 2234 for the Streptomyces aureofaciens A.T.C.C. 13132, there is obtained the same product.

EXAMPLE 3

Methyl pseudoreserpate (a) *Fermentation.*—A one-week old agar slant (prepared by growing the culture on a medium composed of 1.0 g. of glucose, 0.25 g. of yeast extract, 0.1 g. of dipotassium hydrogen phosphate and 2 g. of agar in 100 ml. of water) of Streptomyces rimosus N.R.R.L. 2234 is used to inoculate two flasks each containing 100 ml. of an aqueous sterilized medium containing 1.5% soybean meal, 2.5% glucose and 0.25% calcium carbonate. The flasks are incubated at 25° C. on a rotary shaker set at 180 r.p.m. with a 2″ displacement. After four days the growing cultures are used to inoculate 45 flasks each containing 100 ml. of the same medium. At the same time, 2.25 g. of methyl reserpate is dissolved in 225 ml. of water containing 7 ml. of 1 N sulfuric acid. The solution is sterilized by filtering through sintered glass. To each of the 45 flasks, 5 ml. of the methyl reserpate solution is added to give a concentration of 0.5 mg. per ml. The flasks are incubated on the same shaker and harvested after two weeks.

(b) *Isolation.*—The harvested broth (4.5 l.) is pooled, adjusted to pH 9–10 and extracted four times with 800 ml. portions of methyl isobutyl ketone. The organic layer containing unaltered methyl reserpate and the product, methyl pseudoreserpate, is extracted back into an aqueous acid solution by shaking with 750 ml. of 0.024 sulfuric acid. This aqueous solution is adjusted to pH 9–10 and extracted three times with benzene (250 ml. each time). The benzene extracts the major portion of the unaltered methyl reserpate but not the methyl pseudoreserpate. The aqueous phase is then extracted four times with chloroform (250 ml. each time). The chloroform extract is dried over anhydrous sodium sulfate and evaporated to dryness under vacuum.

The solids obtained are dissolved in 6 ml. of methanol and chromatographed on 12 sheets of Whatman No. 1 filter paper, 10.5″ wide. The solvent system used is i-amyl alcohol carbon tetrachloride-propionic acid (100:10:2) against water vapor equilibrated paper. The chromatogram is allowed to develop for 40 hours. The product appears as a band 3–4 inches wide with the front located approximately 5″ from the origin. The band is cut off, shredded and eluted 4–5 times with methanol. The methanol eluate is taken to dryness in vacuo and the residue taken up in chloroform. The chloroform solution is washed with 5% sodium bicarbonate solution, dried over sodium sulfate and concentrated to dryness.

The methyl pseudoreserpate crystallizes from ethyl acetate in colorless needles, M.P. about 247–248.5° C., $[\alpha]_D$ —112° (pyridine).

EXAMPLE 4

Following the procedure of Example 3, but substituting Streptomyces aureofaciens A.T.C.C. 13132 for the Streptomyces rimosus, there is obtained the same product.

EXAMPLE 5

Following the procedure of Example 3, but substituting Streptomyces aureofaciens N.R.R.L. 2209 for the Streptomyces rimosus there is obtained the same product.

EXAMPLE 6

Methyl raunescate 17,18-diacetate

Methyl raunescate (100 mg.) is dissolved in 8.0 ml. of dry pyridine and 4 ml. of acetic anhydride and the solution allowed to stand at room temperature for two days. The solvents are removed under vacuum and the residue distributed between chloroform and 5% sodium bicarbonate. The chloroform extracts are dried over sodium sulfate and concentrated to dryness. The residue crystallizes from methanol to give methyl raunescate 17,18-diacetate.

EXAMPLE 7

Methyl pseudoreserpate diacetate

Methyl pseudoreserpate (82 mgs.) is dissolved in a mixture of 4 ml. of pyridine and 2 ml. of acetic anhydride and allowed to stand for two days at room temperature. The solvents are removed under vacuum, and the residue dissolved in chloroform. The organic layer is washed with 5% sodium bicarbonate, dried over sodium sulfate and concentrated to dryness. The residue crystallizes from methylene chloride-methanol in colorless plates (about 74 mgs.), M.P. about 273–275° C., $[\alpha]_D$ —88° (chloroform).

Similarly, but substituting other esterifying agents, such as propionic anhydride, for the acetic anhydride in Examples 6 and 7, the corresponding diester derivatives are formed.

The invention may be variously otherwise embodied within the scope of the appended claims.

What is claimed is:

1. A process for preparing a compound selected from the group consisting of methyl pseudoreserpate and methyl raunescate, which comprises subjecting an alkaloid selected from the group consisting of methyl reserpate and methyl deserpidate to the action of enzymes of a microorganism selected from the group consisting of Streptomyces aureofaciens and Streptomyces rimosus in the presence of oxygen.

2. The process of claim 1 wherein the alkaloid is methyl reserpate.

3. The process of claim 1 wherein the alkaloid is methyl deserpidate.

References Cited in the file of this patent

Klohs et al.: JACS, vol. 79 (1957), pp. 3763–3766.

Van Tamelen et al.: JACS, vol. 79 (1957), pp. 5256–5262.

Slater et al.: Proceeding of the Soc. of Exp. Biol., vol. 88, #2, pp. 293–295 (1955).